US010158287B2

(12) United States Patent
Fox et al.

(10) Patent No.: US 10,158,287 B2
(45) Date of Patent: Dec. 18, 2018

(54) VOLTAGE REGULATOR INCLUDING A BUCK CONVERTER PASS SWITCH

(71) Applicant: Hamilton Sundstrand Corporation, Charlotte, NC (US)

(72) Inventors: Brennan Fox, Genesco, IL (US); Christopher Derek Thornton, Saint Charles, IL (US); Kevin C. Peterson, Rockford, IL (US); Adrian E. Vandergrift, Rockton, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 63 days.

(21) Appl. No.: 14/669,519

(22) Filed: Mar. 26, 2015

(65) Prior Publication Data

US 2016/0285364 A1 Sep. 29, 2016

(51) Int. Cl.
*H02M 3/156* (2006.01)
*H03K 17/082* (2006.01)
(Continued)

(52) U.S. Cl.
CPC ............. *H02M 3/156* (2013.01); *H02M 1/32* (2013.01); *H02M 3/157* (2013.01); *H02M 2001/0045* (2013.01)

(58) Field of Classification Search
CPC . H02M 2001/0003; H02M 2001/0045; H02M 3/156; H02M 1/32; H02M 2001/325; G05F 1/569; G05F 1/571; G05F 1/573
See application file for complete search history.

(56) References Cited

U.S. PATENT DOCUMENTS

| 4,580,090 A * | 4/1986 | Bailey | G05F 1/67 |
| | | | 323/282 |
| 6,204,648 B1 * | 3/2001 | Saeki | H02H 7/1213 |
| | | | 323/282 |

(Continued)

FOREIGN PATENT DOCUMENTS

| EP | 2028760 | 2/2009 |
| EP | 2654188 | 10/2013 |

(Continued)

OTHER PUBLICATIONS

European Search Report for Application No. 16162330.1 dated Sep. 22, 2016.

*Primary Examiner* — Gary L Laxton
(74) *Attorney, Agent, or Firm* — Carlson, Gaskey & Olds, P.C.

(57) ABSTRACT

A voltage driver includes a voltage input, a voltage regulation controller including an on/off input. The voltage regulation controller is configured to control a switching converter in a first mode, a second mode, and at least one additional mode. The switching converter is configured to operate as an open pass switch in the first mode, is configured to operate as a closed pass switch in the second mode, and is configured to operate as an overcurrent and overvoltage protection switch in the at least one additional mode. A discrete output driver control and monitoring circuit can be used to control the switching converter. The output driver control and monitoring circuit includes a controller coupled to a communication bus and is configured to provide high level control instructions to the communication bus.

4 Claims, 1 Drawing Sheet

(51) Int. Cl.
    *H02M 1/32*     (2007.01)
    *H02M 3/157*     (2006.01)
    *G05F 1/571*     (2006.01)
    *G05F 1/573*     (2006.01)
    *H02M 1/00*     (2006.01)

(56) References Cited

U.S. PATENT DOCUMENTS

| | | |
|---|---|---|
| 6,597,553 B2 | 7/2003 | Chilcote et al. |
| 7,746,125 B2 | 6/2010 | Storms et al. |
| 8,093,924 B2 | 1/2012 | Kamenicky et al. |
| 2010/0290167 A1* | 11/2010 | Vandergrift ........ H03K 17/0822 361/101 |
| 2011/0090604 A1 | 4/2011 | Butler |
| 2013/0010511 A1 | 1/2013 | Bemat et al. |
| 2014/0125244 A1 | 5/2014 | Nuhfer et al. |
| 2014/0292292 A1 | 10/2014 | Koski |

FOREIGN PATENT DOCUMENTS

| | | |
|---|---|---|
| EP | 2747237 | 6/2014 |
| JP | 2012529124 | 11/2012 |
| WO | 2007005985 | 1/2007 |
| WO | 2013010511 | 6/2013 |

\* cited by examiner

VOLTAGE REGULATOR INCLUDING A BUCK CONVERTER PASS SWITCH

TECHNICAL FIELD

The present disclosure relates generally to voltage regulators, and to a voltage driver including a buck converter pass switch capable of limiting the current and voltage output to a load, and a control configuration for controlling the same.

BACKGROUND

In a control system, a voltage driver is used to energize an external system, such as a relay, contactor or solenoid valve. When used to drive an external load, the driver typically needs to protect itself and its upstream source from the possibility of a short-circuit or load impedance fault to either the load or its cable connections. In some circumstances the load may also need to be protected against excess voltage being passed to it from the upstream source. Protection against short-circuit faults is usually implemented by way of a fuse, thermal breaker, over-current trip or current limit.

Existing voltage drivers utilize a pass transistor operated as a switch (fully on or fully off) during normal operation. The pass transistors are further controlled in a linear mode when a current limited mode of operation is desired. While in the linear mode, the pass transistor passes current while dropping a portion of the supply voltage across the input and output terminal of the pass transistor, in order to limit the current through the pass transistor to a maximum value. The drop in supply voltage induces power dissipation within the pass transistor. In alternative systems, where an overvoltage protection system is implemented alongside the pass transistor, the pass transistor acts as a linear voltage regulator and again dissipates a large amount of power due to the transistor being placed in the linear mode.

During the linear mode, the pass transistor dissipates a large amount of power. The large amount of power dissipation requires that the pass transistor be sized sufficient to handle the power dissipation. Such a transistor, however, is oversized for standard operations resulting in an increased cost and weight. Further, continued dissipation of the high amounts of power within the pass transistor over time can damage the pass transistor. To mitigate this effect the pass transistor is required to be turned off in a short time period after being placed in the linear mode. As such, continued linear mode operations, such as voltage and current limiting, cannot be maintained for an extended period.

SUMMARY OF THE INVENTION

Disclosed is a voltage driver including a voltage input, a voltage regulation controller including an on/off input, the voltage regulation controller configured to control a switching power converter in a first mode, a second mode, and at least one additional mode, and the switching converter being configured to operate as an open pass switch in the first mode, configured to operate as a closed pass switch in the second mode; and configured to operate as an overcurrent and overvoltage protection switch in at least one additional mode.

Also disclosed is a discrete output driver control circuit including a microprocessor controller coupled to a communication bus and configured to provide high level control instructions to the communication bus; a programmable circuit coupled to the communications bus and configured to convert a high level control instruction received from the communications bus to at least one control signal; and a voltage driver connected to said programmable circuit such that said at least one control signal sets an operational mode of at least one component of the voltage driver.

These and other features of the present invention can be best understood from the following specification and drawings, the following of which is a brief description.

DETAILED DESCRIPTION OF AN EMBODIMENT

Figure 1:
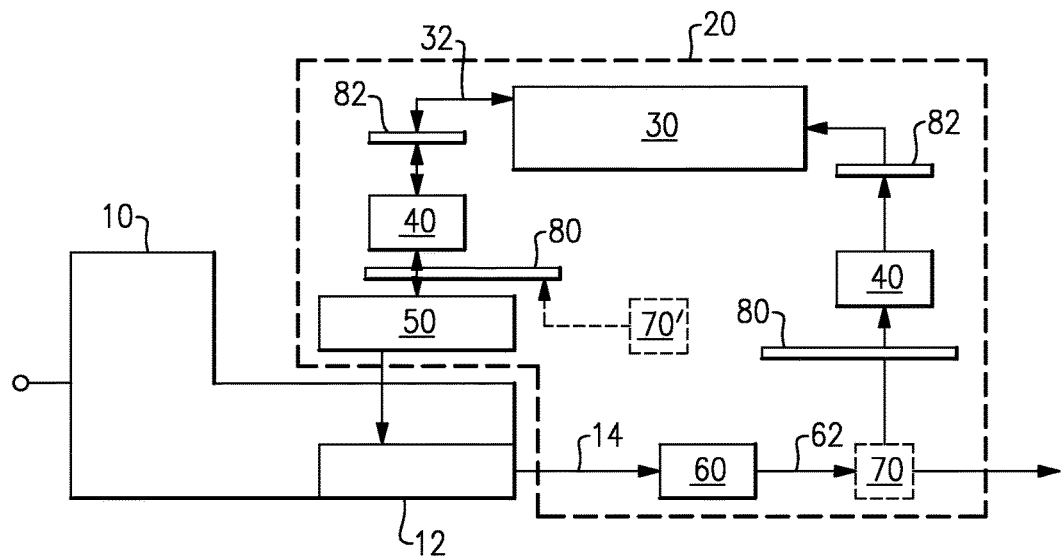
FIG. 1 schematically illustrates a voltage regulation circuit including a control circuit.

FIG. 1 schematically illustrates a voltage regulation circuit including a voltage driver 10, and a corresponding discrete output driver control and monitoring circuit 20. Conventional voltage driver circuits utilize a pass through transistor, such as an FET transistor, to control the output of voltage from the voltage driver with the pass transistor allowing a voltage output while in an on mode and preventing a voltage output in an off mode. The conventional pass transistors are also operated in a linear mode to provide a current limiting mode of operations. In place of the conventional pass transistor, the illustrated voltage driver 10 includes a buck converter 12 configured to operate in multiple modes. In some examples, the buck converter 12 is a buck/boost converter configured in buck mode. In alternate examples the buck converter 12 is only a buck converter 12. In further alternative examples, any type of switching power converter could be utilized in place of the illustrated and described buck converter 12.

A controller 30, within the discrete output driver control and monitoring circuit 20, provides a control output 32 for controlling operations of the buck converter 12. The control output 32 is passed through an isolation and decoupling module 40 to a programmable circuit 50. The controller 30 operates at a low power/voltage level typical of controllers and outputs control instructions at the corresponding power/voltage levels. In contrast, however, the buck converter 12 operates at a high power/voltage level typical of power supply systems. In order to prevent the high power/voltage of the buck converter 12 from damaging, or otherwise impacting, the controller 30, an isolation and decoupling module 40 isolates the output of the controller 30 from direct communication with a communications bus 80. The isolation and decoupling module 40 communicates with the controller 30 through a communications bus 82. In some examples, the isolation and decoupling module 40 has the ability, if applicable, to adjust the voltage level of data going to and coming from the microprocessor controller 30. The communications bus 80, in turn, provides the instruction to the programmable circuit 50. The communications busses 80 and 82 can utilize any standard communications protocol including, but not limited to I2C, SPI, or the like.

Further, control instructions transmitted over the communications bus 80 are not directly compatible with the buck converter 12. The control instructions are high level instructions, and are not control signals capable of causing the buck converter 12 to implement those instructions. The programmable circuit 50 receives the control instructions from the communications bus 80, and converts the control instructions into specific control signals capable of controlling the states and operations of the buck converter 12. While described above as a single direction line of communication to the buck converter 12, one of skill in the art, having the benefit of this disclosure, will understand that the line of communication can, in some examples be bi-directional, allowing the programmable circuit 50 to transmit control information, regarding the buck converter 12, to the controller 30.

An output 14 of the buck converter 12 is passed to a filter module 60. The filtering module 60 can be any type of commercially known filter that is capable of smoothing the voltage output 14 of the buck converter 12. In some examples, the filter module 60 can include two or more distinct filter types. Connected to the output 62 of the filter module 60 is a sensor module 70. The sensor module 70 can include any high power/voltage sensors including a temperature sensor, a current sensor, a voltage sensor, or any number of other known sensor types. The sensed information from the sensor module 70 is provided to the isolation and decoupling module 40, through the bus 80. The isolation and decoupling module 40 converts the high power/voltage sensor information from the sensor module 70 to a low power/voltage input signal. In some examples, the sensor module 70 includes analog to digital conversions for the bus 80. The low power/voltage input signal is then passed to the controller 30. The controller 30, in turn utilizes the sensor readings to generate control instructions for the programmable circuit 50. In some examples, additional sensors 70', such as temperature sensors, can be included in the discrete output driver control and monitoring circuit 20. The additional sensors 70' are connected to the controller 30 through the bus 80.

In one exemplary embodiment, the voltage driver 10 can be included in a Direct Current (DC) Solid State Power Controller (SSPC). In another exemplary embodiment, the voltage driver 10 can be included within a DC Solid State Relay (SSR). In either exemplary embodiment, the buck converter 12 is operated as a pass switch, and the controller 30 is capable of implementing overvoltage prevention and overcurrent prevention features using the buck converter 12. When the controller 30 causes the buck converter 12 to be operated at a 0% duty cycle, the buck converter 12 does not allow any voltage to pass. When the controller 30 causes the buck converter 12 to operate at a 100% duty cycle, the buck converter 12 allows all the voltage to pass.

In conventional SSPC's and SSR's, a pass transistor is operated as the pass switch, and overcurrent control is provided by placing the pass transistor in a linear mode. In the example of FIG. 1, however, the pass transistor is replaced with the buck converter 12. The buck converter 12 is capable of operating at any duty cycle from 0% to 100%, with the specific duty cycle being controlled by the controller 30 using conventional buck converter control techniques. When the controller 30 sets the duty cycle at 0%, the buck converter 12 operates as an open switch and prevents a voltage output from being passed. When the controller 30 sets the duty cycle at 100%, the buck converter 12 operates as a closed switch and allows 100% of the voltage to be passed through the buck converter 12.

During operation of the circuit of FIG. 1, the controller 30 is configured to operate the buck converter 12 in at least one additional mode where the duty cycle is between 0% and 100%. By placing the buck converter 12 into the additional mode, the output voltage and current of the voltage driver 10 is limited dependent upon the duty cycle at which the buck converter 12 is operating, with a higher duty cycle resulting in a higher voltage and current limit.

In some additional examples, when the voltage driver 10 is first enabled, the output voltage 62 is low. The output voltage 62 increases after the voltage driver 10 is first enabled. In such an example, the controller 30 further operates the buck converter 12 in another additional mode. The second additional mode increases the duty cycle of the buck converter 12 above the duty cycle of the first mode. By increasing the duty cycle of the buck converter 12, the output voltage 62 is increased proportionally. In other words, the magnitude of overvoltage protection provided by the buck converter 12 is dependent upon the duty cycle of the buck converter 12.

In yet further examples, multiple additional duty cycle modes can be utilized by the circuit to achieve varying levels of overcurrent and overvoltage control as conditions dictate.

Figure 2:
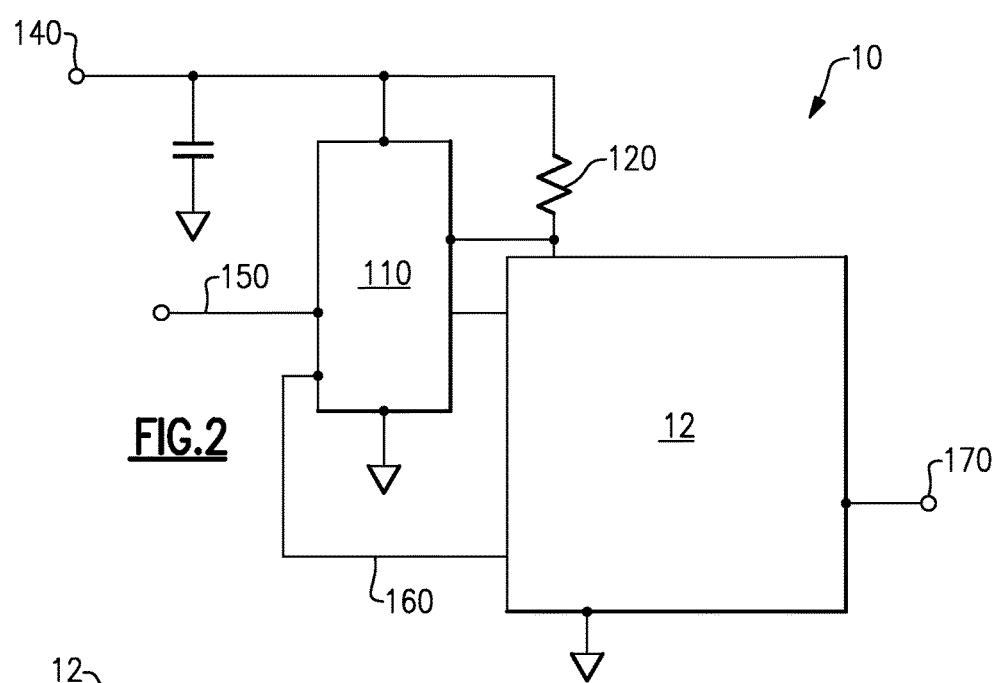
FIG. 2 schematically illustrates an exemplary voltage regulator, as could be used in the voltage regulation circuit of FIG. 1, in greater detail.

With continued regards to FIG. 1, and with like numerals indicating like elements, FIG. 2 illustrates a more detailed schematic view of the voltage driver 10 including the buck converter 12. The voltage driver 10 includes a switching regulation controller 110 with an on/off input 150. The on/off input is connected to a control interface, such as the communications bus 80, and receives control signals for the voltage driver 10 from an external controller.

An input voltage 140 is received from a voltage source, and connected to the switching regulation controller 110, and a current sense resistor 120. The current sense resistor 120 is connected to a standard buck converter 12. The buck converter 12 is controlled by the switching regulation controller 110, according to known control techniques. The current sense resistor provides a current sensing back to the switching regulation controller 110, and allows the switching regulation controller to utilize current based feedback controls. Included within the buck converter 12 is a voltage sensing arrangement that provides a sensed voltage output 160 to the switching regulation controller 110. The buck converter 12 includes a voltage output 170 and is connected to a discrete output driver control and monitoring circuit 20 as illustrated in FIG. 1. While illustrated schematically in FIG. 1 as the programmable circuit 50 directly controlling the buck converter 12, one of skill in the art will appreciate that the programmable circuit 50 can be interfaced with the switching regulation controller 110 and provide indirect control to the buck converter 12. In alternative examples, the switching regulation controller 110 and the programmable circuit 50 can be a single programmable circuit capable of performing both functions.

Figure 3:
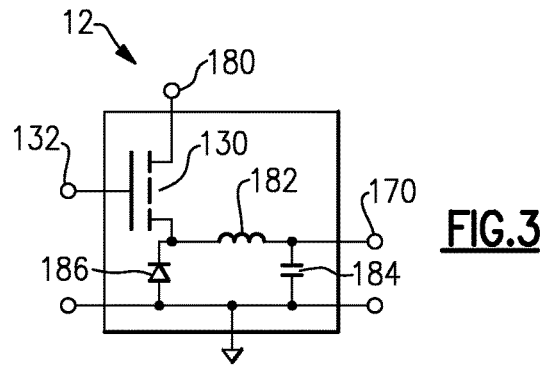
FIG. 3 schematically illustrates an exemplary buck converter for utilization with the voltage regulator of FIG. 2.

With continued reference to FIGS. 1 and 2, and with like numerals indicating like elements, FIG. 3 schematically illustrates an exemplary buck converter 12 topology that can be utilized in the illustrated circuits of FIGS. 1 and 2. The buck converter 12 includes a transistor 130 with a control input 132. The control input 132 is connected to the switching regulation controller 110 and controls the duty cycle of the buck converter 12. A voltage input 180 is connected to one end of the transistor 130, and provides a current to an inductor 182, a capacitor 184, and a free-wheeling diode 186.

The inductor 182, capacitor 184 and free-wheeling diode 186 are arranged as a conventional buck converter 12, and provide a voltage to the voltage output 170. The voltage output 170 is reduced, relative to the voltage input 180 proportional to the duty cycle generated by the switching of the transistor 130.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A voltage driver comprising:
a voltage input;
a voltage regulation controller including an on/off input, the voltage regulation controller configured to control a switching converter in a first mode, a second mode, and at least one additional mode;
the switching converter being configured to operate as an open pass switch in the first mode by being configured as a fully open switch, configured to operate as a closed pass switch in the second mode by being configured as a fully closed switch; and configured to operate as an overcurrent and overvoltage protection switch in the at least one additional mode; and
wherein an overvoltage threshold of the voltage driver in said at least one additional mode is dependent on a duty cycle of the switching converter in the least one additional mode.

2. A voltage driver comprising:
a voltage input;
a voltage regulation controller including an on/off input, the voltage regulation controller configured to control a switching converter in a first mode, a second mode, and at least one additional mode; and
the switching converter being configured to operate as an open pass switch in the first mode, configured to operate as a closed pass switch in the second mode, configured to operate as an overcurrent and overvoltage protection switch in the at least one additional mode, the at least one additional mode is mutually exclusive with the first mode and the second mode;
a second controller communicatively coupled to the switching converter via at least a programmable circuit; and
the programmable circuit being configured to receive an instruction from the second controller and output corresponding switching converter control signals.

3. A voltage driver comprising:
a voltage input;
a voltage regulation controller including an on/off input, the voltage regulation controller configured to control a switching converter in a first mode, a second mode, and at least one additional mode;
the switching converter being configured to operate as an open pass switch in the first mode by being configured as a fully open switch, configured to operate as a closed pass switch in the second mode by being configured as a fully closed switch; and configured to operate as an overcurrent and overvoltage protection switch in the at least one additional mode;
a second controller communicatively coupled to the switching converter via at least a programmable circuit;
the programmable circuit being configured to receive an instruction from the second controller and output corresponding switching converter control signals
wherein the second controller is configured to output control signals at a first power level, the switching converter is configured to receive control signals at a second power level, the second power level being higher than the first power level; and
an isolation module connecting said second controller to said programmable circuit such that the second controller is isolated from the converter.

4. A voltage driver
comprising: a voltage input;
a voltage regulation controller including an on/off input, the voltage regulation controller configured to control a switching converter in a first mode, a second mode, and at least one additional mode;
the switching converter being configured to operate as an open pass switch in the first mode by being configured as a fully open switch, configured to operate as a closed pass switch in the second mode by being configured as a fully closed switch; and configured to operate as an overcurrent and overvoltage protection switch in the at least one additional mode;
a second controller communicatively coupled to the switching converter via at least a programmable circuit;
the programmable circuit being configured to receive an instruction from the second controller and output corresponding switching converter control signals
wherein said second controller is configured to set an overvoltage limit at a first level during power on and at a second level, lower than the first level, during continued operations in at least one additional mode.

* * * * *